(12) United States Patent
Wilson et al.

(10) Patent No.: US 8,730,187 B2
(45) Date of Patent: May 20, 2014

(54) TECHNIQUES FOR SORTING DATA THAT REPRESENTS TOUCH POSITIONS ON A SENSING DEVICE

(75) Inventors: Cole D. Wilson, Everett, WA (US); Dana Jon Olson, Kirkland, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 781 days.

(21) Appl. No.: 12/792,664

(22) Filed: Jun. 2, 2010

(65) Prior Publication Data
US 2012/0044151 A1 Feb. 23, 2012

Related U.S. Application Data

(60) Provisional application No. 61/256,290, filed on Oct. 29, 2009.

(51) Int. Cl.
*G06F 3/041* (2006.01)

(52) U.S. Cl.
USPC .......................................................... 345/173

(58) Field of Classification Search
USPC .......................................... 345/156, 173–178
See application file for complete search history.

(56) References Cited

U.S. PATENT DOCUMENTS

| | | | | |
|---|---|---|---|---|
| 5,905,489 A | * | 5/1999 | Takahama et al. | 345/174 |
| 5,929,834 A | * | 7/1999 | Inoue et al. | 345/104 |
| 6,323,846 B1 | * | 11/2001 | Westerman et al. | 345/173 |
| 7,152,014 B2 | | 12/2006 | Bang et al. | |
| 7,800,594 B2 | * | 9/2010 | Nakamura et al. | 345/175 |
| 7,812,829 B2 | | 10/2010 | Gillespie et al. | |
| 2004/0021633 A1 | * | 2/2004 | Rajkowski | 345/156 |
| 2005/0246109 A1 | | 11/2005 | Bang et al. | |
| 2006/0026536 A1 | | 2/2006 | Hotelling et al. | |
| 2008/0042994 A1 | | 2/2008 | Gillespie et al. | |
| 2009/0256817 A1 | | 10/2009 | Perlin et al. | |
| 2009/0284495 A1 | | 11/2009 | Geaghan et al. | |
| 2009/0327975 A1 | | 12/2009 | Stedman | |

OTHER PUBLICATIONS

International Search Report of International Searching Authority, dated Dec. 20, 2010 for International Application No. PCT/US10/54832 ; 4 pages.
International Written Opinion of International Searching Authority, dated Dec. 20, 2010 for International Application No. PCT/US10/54832 ; 5 pages.

\* cited by examiner

*Primary Examiner* — Chanh Nguyen
*Assistant Examiner* — Ram Mistry

(57) ABSTRACT

An apparatus includes a memory and a processing device comprising touch sorting logic. The touch sorting logic sorts the raw touch position data in two stages. In each of the stages, the touch sorting logic predicts the centroid positions for each touch of the plurality of touches, compares the predicted centroid positions for each touch and indexes the centroid position for each touch based on the predicted centroid position that is closest to the raw touch position data. The sorted touch position data is sorted according to the touch index assigned to each of the centroid positions for each of the plurality of touches.

20 Claims, 6 Drawing Sheets

| Time | Coordinate 1 | Coordinate 2 |
|---|---|---|
| t1 | F1 | F2 |
| t2 | F1 | F2 |
| t3 | F1 | F2 |

TECHNIQUES FOR SORTING DATA THAT REPRESENTS TOUCH POSITIONS ON A SENSING DEVICE

RELATED APPLICATION

This application claims the benefit of U.S. Provisional Application No. 61/256,290, filed Oct. 29, 2009.

TECHNICAL FIELD

This invention relates to the field of user interface devices and, in particular, to touch-sensor devices.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes that contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis.

One type of touchpad operates by way of capacitance sensing utilizing capacitance sensors. The capacitance, detected by a capacitance sensor, changes as a function of the proximity of a conductive object to the sensor. The conductive object can be, for example, a stylus or a user's finger. In a touch-sensor device, a change in capacitance detected by each sensor in the X and Y dimensions of the sensor array due to the proximity or movement of a conductive object can be measured by a variety of methods. Regardless of the method, usually an electrical signal representative of the capacitance detected by each capacitive sensor is processed by a processing device, which in turn produces electrical or optical signals representative of the position of the conductive object in relation to the touch-sensor pad in the X and Y dimensions. A touch-sensor strip, slider, or button operates on the same capacitance-sensing principle.

Another user interface device that has become more common is a touch screen. Touch screens, also known as touch-screens, touch panels, or touchscreen panels, are display overlays, which are typically pressure-sensitive (resistive), electrically-sensitive (capacitive), acoustically-sensitive (surface acoustic wave (SAW)) or photo-sensitive (infra-red) overlays. The effect of such overlays allows a display to be used as an input device, removing or augmenting the keyboard and/or the mouse as the primary input device for interacting with the display's content. Such displays can be attached to computers or, as terminals, to networks. There are a number of types of touch screen technologies, such as optical imaging, resistive, surface acoustical wave, capacitive, infrared, dispersive signal, piezoelectric, and strain gauge technologies. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data.

A first type of conventional touchpad is composed of a matrix of rows and columns. Each row or column is composed of multiple sensor pads. However, all sensor pads within each row or column are coupled together and operate as one long sensor element. The number of touches a touchpad can resolve is not the same as the number it can detect. For example, even though a conventional touchpad may have the capability to detect two substantially simultaneous touches with an X/Y matrix, the conventional touchpad cannot resolve the location of the two substantially simultaneous touches. Conventional two-axes X/Y matrix touchpad/touchscreen designs are typically implemented as two independent linear sliders, placed physically orthogonal to each other, and substantially filling a planar area. Using a centroid-processing algorithm to determine the peak in sensed capacitance, one slider is used to determine the X location of a touch and the second slider is used to determine the Y location of the touch.

A second type of conventional touchpad, referred to as an all-points-addressable (APA) array, is composed of a similar X/Y array of sense elements. It differs from the first type in how the capacitance is sensed. Here, each row and column is composed of multiple sensor pads, and is capable of independent detection of a capacitive presence and magnitude at the intersection of each row and column. Typically, a processing device coupled to the array scans the array, such as from left to right and from top to bottom, and determines the centroid positions of all touches on the touchpad, using a centroid-processing or similar algorithm. The raw data, following centroid processing, is unsorted X/Y coordinate data of resolved touch positions, which can be used to determine cursor movement and gesture detection. The processing device processes the raw data, which is unsorted X/Y coordinate data, and the raw data is ordered based on the position of the sensors, the order in which the sensors were measured, or other ordering method, and not the relative touch that is detected. For example, one conventional method orders the data along the column index of the track pad. When filtering the unsorted position data to produce a smoother response for touch movement and gesture detection, the unsorted raw position data can disrupt filtering when the detection order of the touches changes. For example, the processing device can filter the raw position data to smooth the response of the movement of the touches on the touchpad. However, when the order of the touch detection changes, such as the order of the touches being detected changing in the vertical axis such as illustrated in FIG. 1, the filtering techniques, such as an infinite impulse response (IIR) filtering technique, would fail. Also, since the raw data is ordered based on the position of the sensors and not sorted according to the individual touches detected, the gesture recognition algorithms are more complex because they have to account for the data being unsorted, and often fail to work for multi-touch gestures crossing the same vertical axis (or horizontal axis when the scan is based on the row indexes).

FIG. 1 illustrates a detection profile 100 of two touches 101 (F1) and 102 (F2) with a conventional touchpad 110 at three discrete points in time (t1, t2, and t3). The detection profile 100 shows that the first touch 101 (F1) moves across the touchpad 110, while the second touch 102 (F2) remains approximately stationary. When scanning the sensors using a column index, the processing device, at the first time point, t1, receives an X/Y centroid coordinate corresponding to the first touch 101 (F1), and then the X/Y centroid coordinate corresponding to the second touch 102 (F2). However, at the second and third time point, the processing device receives an X/Y centroid coordinate corresponding to the second touch 102 (F2), and then the X/Y centroid coordinate corresponding to the first touch 101 (F1), resulting in a change in the order of the first and second resolved touches 101 and 102. When applying a filtering technique, the filtering technique will fail because of the change in the order of touches.

BRIEF DESCRIPTION OF THE DRAWINGS

The present invention is illustrated by way of example, and not by way of limitation, in the figures of the accompanying drawings.

DETAILED DESCRIPTION

Figure 1:
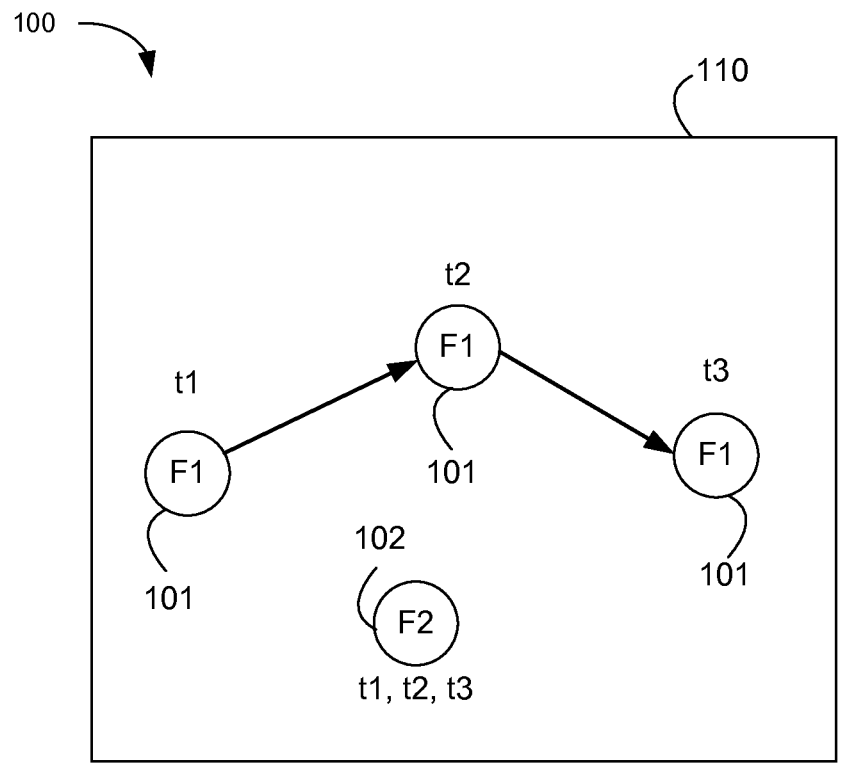
FIG. 1 illustrates a detection profile of two touches with a conventional touchpad at three discrete points in time.

A method and apparatus for sorting raw touch position data is described. In one embodiment, a method receives raw touch position data representing positions of fingers or other conductive objects on a sensing device, and sorts the raw touch position data according to a touch identifier (e.g., touch index) assigned to each centroid position for each of the touches at discrete points in time. The method tracks the touches on the sensing device using the sorted touch position data. In one embodiment, the method processes the sorted touch position data individually on a touch-by-touch basis for cursor movement and/or gesture detection. In one embodiment, the method sorts the raw touch position data using a three-stage algorithm, referred to herein as a touch-sorting algorithm. Each stage makes an informed guess at the next position of the incoming raw touch position data. The algorithm then compares the guess to the actual incoming data and indexes the touches according to the raw touch position data at the closest guess. In one embodiment, the sorted data is stored in memory (e.g., Random Access Memory (RAM)). In one embodiment, the algorithm adjusts based on the incoming raw data and does not require a buffer so there is no significant memory usage to track the individual touches. The method indexes the raw touch position data in order of the touches present on the touchpad and handles the removal and/or addition of touches on the touchpad.

The embodiments described herein solve at least some of the problems of the conventional devices and methods, as described above, by sorting the raw touch position data according to touch indexes assigned to each of the centroid positions for each touch at discrete points in time. By sorting the raw touch position data according to touch indexes, the touch position data can be processed individually on a touch-by-touch basis for cursor movement and gesture detection, as well as filtered individually, which reduces the complexity of the gesture recognition code. The gestures may be scrolling gestures (vertical, horizontal, diagonal, or rotational), panning gestures, pinching gestures, zooming gestures, growing/shrinking gestures, gestures for various functions, including volume control, minimizing function, rotating images, turning pages, adjusting screen brightness, or the like. In one embodiment, the method receives the raw touch position data, which includes unsorted X/Y coordinates of the centroid positions of the touches used for cursor movement and gesture detection. The method sorts the data into individual touches so each touch can be individually processed and filtered, such as using a standard IIR low pass filter.

With sorted data, developers can reduce the complexity of the gesture recognition algorithms. Sorting the raw touch position data may reduce computational resources used to process the raw touch position data, such as to the computational resources for gesture detection, because the gesture detection algorithms can be simplified. Sorting the raw touch position data can also provide a smoother response on the touchpad, since the sorted data can be filtered easier than unsorted data. By sorting the raw touch position data, the processing device can implement complicated gesture recognition algorithms using the sorted data. The embodiments described herein can be used in any multi-touch sensing device, such as an APA array, a X/Y array, a tri-axial sensing layout, or a multi-axial sensing array, or the like. Also, using the embodiments described herein, the sorted data can be sent to a host for touch movement and gesture recognition computations.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

Figure 2:
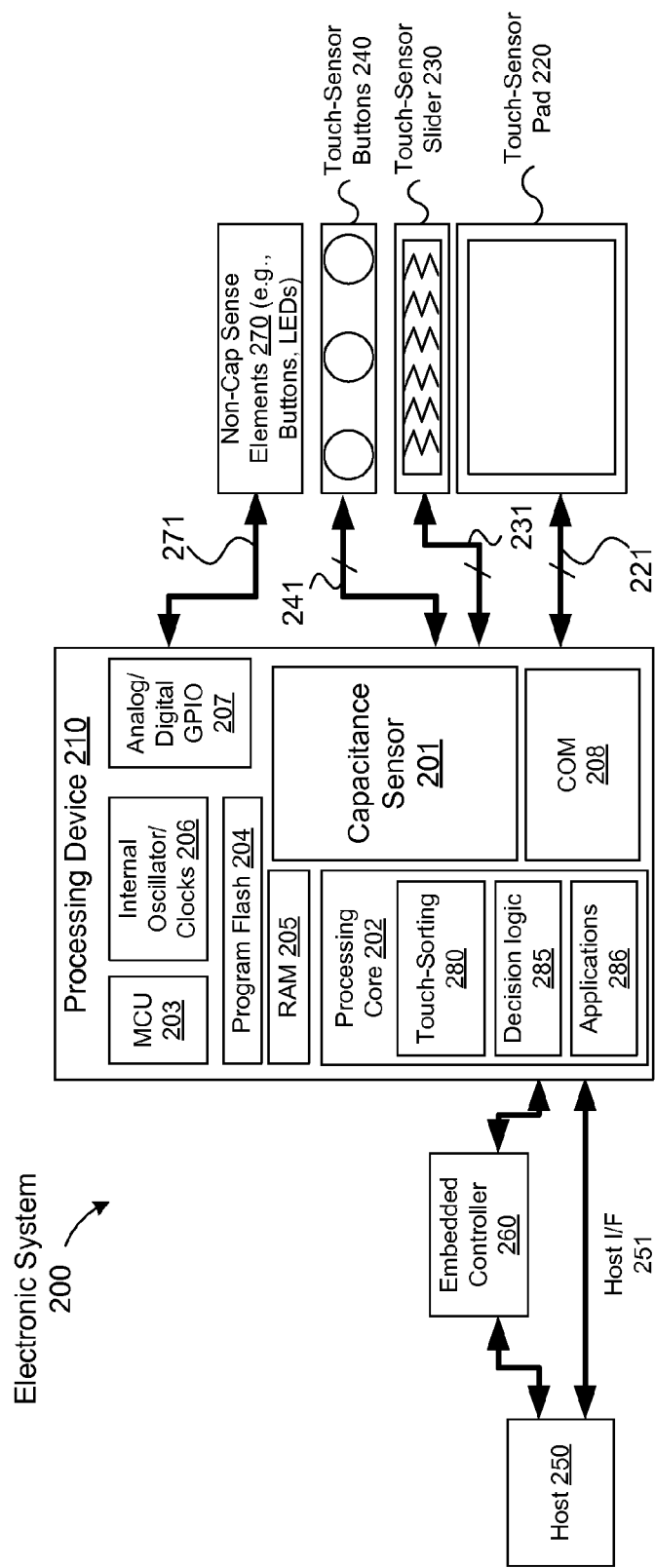
FIG. 2 illustrates a block diagram of one embodiment of an electronic system having a processing device for sorting raw touch position data.

FIG. 2 illustrates a block diagram of one embodiment of an electronic system 200 having a processing device 210 for sorting raw touch position data. The electronic system 200 includes the processing device 210, a touch-sensor pad 220, a touch-sensor slider 230, touch-sensor buttons 240, a host processor 250, an embedded controller 260, and non-capacitance sensor elements 270.

The processing device 210 includes touch-sorting logic 280. The operations of touch-sorting logic 280 may be implemented in firmware; alternatively, it may be implemented in hardware or software or any combination thereof. The touch-sorting logic 280 may be configured to receive the digital code or counts from the capacitance sensor 201, calculate one or more centroids based on these codes or counts, and to sort the raw touch position data as described herein. In one embodiment the touch-sorting logic 280 is configured to determine the centroid positions of each of the touches present on the touch-sensor pad 220 using the digital code or counts. In another embodiment, the touch-sorting logic 280 is configured to receive the raw touch position data from the capacitance sensor 201, the raw touch position data including the centroid positions of the touches, positions, indicative of the positions of the touches on the touch-sensor pad 220 at discrete points in time. In one embodiment, the touch-sorting logic 280 receives a sample for each scan, each sample including the centroid positions of the touches detected in the respective scan.

In applications for touch-sensor sliders and touch-sensor pads it is often necessary to determine touch (finger or other capacitive objects) position to greater resolution than the native pitch of the individual sensor elements. The contact and fringe-detection area of a finger on a slider, touch-pad, or touch screen sensor is often larger than any single sensor element. In one embodiment, in order to calculate the interpolated position, the processing device 210 uses a centroid-processing algorithm to determine the peak in sensed capacitance. Using the centroid-processing algorithm, the processing logic computes a centroid position using the strong signal and those immediately adjacent, such as expressed in the following expression:

$$\text{Centroid} = \frac{n_{i-1} \cdot (i-1) + n_i i + n_{i+1} \cdot (i+1)}{n_{i-1} + n_i i + n_{i+1}}$$

The calculated value may be fractional. In order to report the centroid to a specific resolution, for example a range of 0 to 100 for 12 sensor elements, the centroid value may be multiplied by a calculated or predetermined scalar. It may be more efficient to combine the interpolation and scaling operations into a single calculation and report this result directly in the desired scale. This may be handled in the high-level APIs. Alternatively, other methods may be used to interpolate the position of the conductive object (e.g., finger, stylus). The centroid calculation may also differ when using other types of sensing devices, such as an APA array.

In another embodiment, the processing device 210 further includes a decision logic block 285. The operations of decision logic block 285 may be implemented in firmware; alternatively, it may be implemented in hardware or software or any combination thereof. The decision logic block 285 may be configured to receive the sorted touch position data from the touch-sorting logic 280, and to determine the state of the sensor array (e.g., touch-sensor pad 220), such as whether one or more conductive objects are detected on or in proximity to the sensor array, and where the conductive objects are detected on the sensor array based on the centroid positions (X/Y coordinates). The decision logic block 285 may also be configured to determine absolute or relative position of the conductive object, determining speed of the conductive object, or the like, as described herein. Also, the processing core 202 can execute applications 286 to perform routines on the received data, such as compensating for sensitivity differences, other compensation algorithms, baseline update routines, start-up and/or initialization routines, interpolation operations, scaling operations, and the like.

In another embodiment, instead of performing the operations of the decision logic 285 in the processing device 210, the processing device 201 may send the raw data to the host 250. The host 250, as illustrated in FIG. 2, may include the decision logic 285. The operations of decision logic 285 may also be implemented in firmware, hardware, and/or software. Also, the host may include high-level APIs in applications that perform routines on the received data, such as compensating for sensitivity differences, other compensation algorithms, baseline update routines, start-up and/or initialization routines, interpolation operations, scaling operations, and the like. The operations described with respect to the decision logic 285 may be implemented in other hardware, software, and/or firmware external to the processing device 210.

The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnect between GPIO ports 207 and a digital block array of the processing device 210 (not illustrated). The digital block array may be configured to implement a variety of digital logic circuits (e.g., DAC, digital filters, digital control systems) using, in one embodiment, software or firmware in the form of configurable user modules ("UMs"). The digital block array may be coupled to a system bus (not illustrated). Processing device 210 may also include memory, such as random access memory (RAM) 205 and program flash 204. RAM 205 may be static RAM (SRAM) or the like, and program flash 204 may be a non-volatile storage, or the like, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. Also, the analog block array may be configured to implement a variety of analog circuits (e.g., ADC, analog filters) using, in one embodiment, configurable UMs. The analog block array may also be coupled to the GPIO 207.

In one embodiment, the electronic system 200 includes a touch-sensor pad 220 coupled to the processing device 210 via bus 221. In one embodiment, the touch-sensor pad 220 is a touchpad. In another embodiment, the touch-sensor pad 220 is a touchscreen. Touch-sensor pad 220 may include a two-dimension sensor array. The two-dimension sensor array includes multiple sensor elements, organized as rows and columns. In another embodiment, the touch-sensor pad 220 is an APA array. In another embodiment, the electronic system 200 includes a touch-sensor slider 230 coupled to the processing device 210 via bus 231. Touch-sensor slider 230 may include a single-dimension sensor array. The single-dimension sensor array includes multiple sensor elements, organized as rows, or, as columns, or alternatively, as radial elements. In another embodiment, the electronic system 200 includes touch-sensor buttons 240 coupled to the processing device 210 via bus 241. Touch-sensor buttons 240 may include a single-dimension or multi-dimension sensor array. The single- or multi-dimension sensor array may include multiple sensor elements. For touch-sensor buttons, touch-sensor sliders, or an n-dimensional touch sensor array, the sensor elements may be coupled together to detect a presence of a conductive object over the entire surface of the sensing device. Alternatively, the touch-sensor button 240 has a single sensor element to detect the presence of the conductive object. In one embodiment, the touch-sensor button 240 may be a capacitance sensor element. Capacitance sensor elements may be used as non-contact sensors. These sensor elements, when protected by an insulating layer, offer resistance to severe environments.

The electronic system 200 may include any combination of one or more of the touch-sensor pad 220, touch-sensor slider 230, and touch-sensor button 240. In another embodiment, the electronic system 200 may also include non-capacitance sensor elements 270 coupled to the processing device 210 via bus 271. The non-capacitance sensor elements 270 may include buttons, light emitting diodes (LEDs), and other user interface devices, such as a mouse, a keyboard, a display, or other functional keys that do not require capacitance sensing. In one embodiment, buses 271, 241, 231, and 221 may be a single bus. Alternatively, these buses may be configured into any combination of one or more separate buses. The processing device 210 may also provide value-added functionality such as keyboard control integration, LEDs, battery charger, and general purpose I/O, as illustrated as non-capacitance sensor elements 270. Non-capacitance sensor elements 270 are coupled to the GPIO 207. In another embodiment, the processing device 210 may also include a non-capacitance sensing actions block. This block may be used to process and/or receive/transmit data to and from the host 250. For example, additional components may be implemented to operate with the processing device 210 along with the touch-sensor pad 220 (e.g., keyboard, keypad, mouse, trackball, LEDs, displays, or the like).

As illustrated, capacitance sensor 201 may be integrated into processing device 210. Capacitance sensor 201 may include analog I/O for coupling to an external component, such as the touch-sensor pad 220, touch-sensor slider 230, touch-sensor buttons 240, and/or other devices. Capacitance sensor 201 may be integrated into the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware description language, such as VHDL or Verilog, and stored to a computer-accessible medium (e.g., Flash ROM, CD-ROM, hard disk, floppy disk, etc.). Furthermore, the behavioral level code can be compiled into a netlist, or even a circuit layout, and stored to a computer-accessible medium. The behavioral level code, the netlist, and the circuit layout all represent various levels of abstraction to describe capacitance sensor 201. In one embodiment, capacitance sensor 201 is based on a capacitance sensing relaxation oscillator (CSR). Although it should be noted that there are various known methods for measuring capacitance, such as, for example, current versus voltage phase shift measurement, resistor-capacitor charge timing, capacitive bridge divider, charge transfer, successive approximation, sigma-delta modulators, charge-accumulation circuits, field effect, mutual capacitance, frequency shift, or the like. It should be noted however, instead of evaluating the raw counts relative to a threshold, the capacitance sensor may be evaluating other measurements to determine the user interaction. For example, in the capacitance sensor having a sigma-delta modulator, the capacitance sensor is evaluating the ratio of pulse widths of the output, instead of the raw counts being over a certain threshold.

It should also be noted that the embodiments described herein may be implemented in sensing technologies other than capacitive sensing, such as resistive, optical imaging, surface acoustical wave (SAW), infrared, dispersive signal, strain gauge technologies, or the like. Similarly, the operations described herein are not limited to notebook pointer or mouse emulation operations, but can include other operations, such as lighting control (dimmer), temperature or environmental control, volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

Processing device 210 may include internal oscillator/clocks 206 and communication block 208. The oscillator/clocks block 206 provides clock signals to one or more of the components of processing device 210. Communication block 208 may be used to communicate with an external component, such as a host processor 250, via host interface (I/F) 251. Alternatively, the processing device 210 may also be coupled to embedded controller 260 to communicate with the external components, such as host 250. Interfacing to the host 250 can be through various methods. In one exemplary embodiment, interfacing with the host 250 may be done using a standard PS/2 interface to connect to an embedded controller 260, which in turn sends data to the host 250 via a low pin count (LPC) interface. In some instances, it may be beneficial for the processing device 210 to do both sensing device and keyboard control operations, thereby freeing up the embedded controller 260 for other housekeeping functions. In another exemplary embodiment, interfacing may be done using a universal serial bus (USB) interface directly coupled to the host 250 via host interface 251. Alternatively, the processing device 210 may communicate to external components, such as the host 250 using industry standard interfaces, such as USB, PS/2, inter-integrated circuit (I2C) bus, Serial Peripheral Interface (SPI), or the like. The host 250 and/or embedded controller 260 may be coupled to the processing device 210 with a rigid ribbon, or flex cable, from an assembly which houses the sensing device and processing device.

In one embodiment, the processing device 210 is configured to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers, such as dedicated touch-sensor pad drivers, or other drivers known by those of ordinary skill in the art. Alternatively, the processing device 210 may be configured to communicate with the embedded controller 260. It should also be noted that the host 250 may communicate directly with the processing device 210 via host interface 251.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be the Programmable System on a Chip (PSoC®) processing device, developed by Cypress Semiconductor Corporation, San Jose, Calif. Alternatively, processing device 210 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device 210 may be a network processor having multiple processors including a core unit and multiple microengines. Additionally, the processing device 210 may include any combination of general-purpose processing device(s) and special-purpose processing device(s).

It should also be noted that the embodiments described herein are not limited to having a configuration of a processing device coupled to a host, but may include a system that measures the capacitance on the sensing device and sends the raw data to a host computer where it is analyzed by an application. In effect the processing that is done by processing device 210 may also be done in the host. In another embodiment, the processing device 210 is the host.

It should be noted that the components of electronic system 200 may include all the components described above. Alternatively, electronic system 200 may include only some of the components described above, or include additional components not listed herein.

Figure 3:
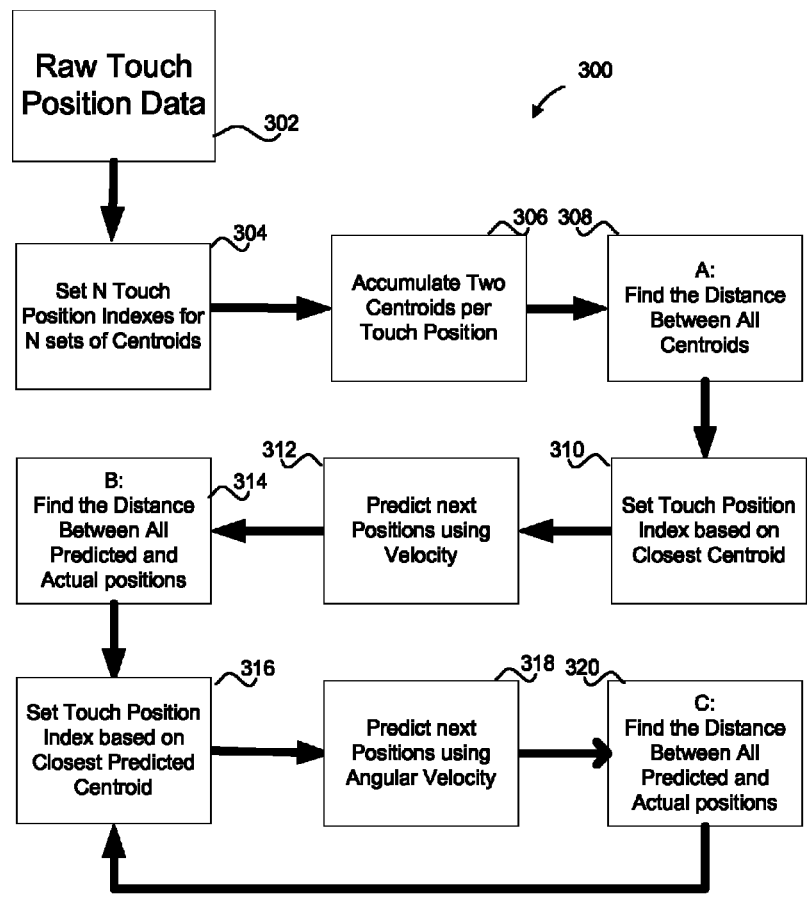
FIG. 3 illustrates a flow diagram of one embodiment of a method of sorting raw touch position data.

FIG. 3 illustrates a flow diagram of one embodiment of a method of sorting raw touch position data. The method 300 is performed by processing logic that may comprise hardware (circuitry, dedicated logic, etc.), software (such as is run on a general purpose computer system or a dedicated machine), firmware (embedded software), or any combination thereof. In one embodiment, the touch-sorting logic 280 of FIG. 2 performs the method 300. In another embodiment, the host 250 of FIG. 2 performs the method of 300. Alternatively, other components of the electronic system 200 can perform some or all of the operations of method 300.

Referring to FIG. 3, processing logic begins with receiving raw touch position data (block 302), and sets the number (N) of touch indexes for a set of N centroid positions detected on the sensing device (block 304). At block 304, the processing logic determines the number of touches for which it needs to sort. This number may be an input to the three-stage algorithm, such as an input to the "for" loops of the algorithm, and is used to physically sort the resolved touches. It should also be noted that the last touch does not need to be sorted because sorting the other N−1 touches will naturally sort the last N touch. Once the processing logic accumulates two centroid positions per touch, the processing logic may perform a three-stage algorithm. The purpose of each stage is to correctly index the raw centroid positions with the correct touch's centroid position. That is, the raw touch position data coming in will not be in any particular order in terms of the specific touch associated with the raw touch position data. Various touch-sensing techniques may be used to determine the touch centroid positions, such as slope detection, vertical scanning, sensor isolation, nearest neighbor/least squares, and resolve scan. Regardless of the technique, the raw touch position data is typically ordered based on the position of the sensors relative to the scan direction and not the relative finger or other object touching the sensing device. Therefore, the touch-sorting algorithm will be used to look at the raw touch position data as it comes in and assign each of the associated centroid positions a touch identifier to sort the raw touch position data according to the touch indexes, allowing the touches to be individually tracked on the sensing device. This touch identifier can then be used to filter the touch position data on a touch-by-touch basis and will also enhance the current implementation of gesture detection.

The first stage of the touch-sorting algorithm is the 'A' stage (blocks 308 and 310). In the A stage, the processing logic uses a distance measurement to determine the closest centroid positions (block 308), and sets the touch identifier based on the closest centroid position (block 310). As an example, there may be four touches on the sensing device, which yields four unique touch centroid positions. On a sample-by-sample basis these touch centroid positions may not move very far during the next scan. Therefore, the distance between $C_{1,N}$ and $\{C_{1,N+1}, C_{2,N+1}, C_{3,N+1}, C_{4,N+1}\}$ will determine which of the points $\{C_{1,N+1}, C_{2,N+1}, C_{3,N+1}, C_{4,N+1}\}$ the touch which created $C_{1,N}$ is associated with. The same measurement will be done for $C_{2,N}$, $C_{3,N}$, and $C_{3,N}$, which yields a computational overhead of N factorial (N!) calculations for each scan. However, stage A may only be applied on the initial stage when a touch or finger is removed or when a new touch is detected.

The second stage of the algorithm is the 'B' stage (block 312-316). In the B stage, the processing logic also uses a distance measurement (block 314). However, instead of using the raw touch position data, the processing logic in the B stage predicts where the third point will be using the velocity between the first two measured points and the time between successive samples, which will be called V1 (block 312). This predicted point will be called P3'. A similar distance calculation of all predicted values versus the actual C3 values will be used to find which of the C3 points are associated with the previous two points found by stage A (block 314). The processing logic sets the touch indexes based on the closest predicted centroid position (block 316).

The final stage of the algorithm is the 'C' stage (blocks 318-320 and 316). In the 'C' stage, a distance measurement is once again used to find association of incoming raw touch position data to the previous raw touch position data. Much like the B stage, the processing logic compares a predicted position against the real data to determine the association (block 320), and the processing logic will set the touch indexes based on the closest predicted centroid position (block 316). These points will be labeled P4'-PN'. This stage uses the angular velocity (or acceleration) of the previous three points to create a new prediction of the next point (block 318). Because there are three points being used in this calculation, the processing logic can estimate angular velocity and therefore predict curvature at block 318. The smallest distance between the predicted point and the actual point provide the final indexing required and completes the touch-sorting algorithm.

In one embodiment, the processing logic performs the touch-sorting algorithm using the following exemplary equations. It should be noted that the distances in the following exemplary equations represent the distance squared. Alternatively, other equations may be used.

$$p_N = x_N + y_N$$

$$\text{dist}_A = (x_2-x_1)^2 + (y_2-y_1)^2 = |V_{1,2}|^2 \quad \text{Stage A:}$$

$$V_{N,N+1} = (x_{N+1}-x_N)\hat{i} + (y_{N+1}-y_N)\hat{j}$$

$$p'_3 = p_2 + V_{1,2} = (x_2+(x_2-x_1))\hat{i} + (y_2+(y_2-y_1))\hat{j} = (2x_2-x_1)\hat{i} + (2y_2-y_1)\hat{j}$$

$$\text{dist}_B = (x'_3-x_3)^2 - (y'_3-y_3)^2 \quad \text{Stage B:}$$

$$p'_4 = p_3 + V_{2,3} + (V_{2,3}-V_{1,2}) = p_3 + 2V_{2,3} - V_{1,2}$$

$$\text{dist}_C = (x'_{N+3}-x_{N+3})^2 - (y'_{N+3}-y_{N+3})^2 \quad \text{Stage C:}$$

In one embodiment, the touch-sorting algorithm may be performed before filtering the touch position data and before high-level gesture detection. For example, by successfully tracking a finger (or other conductive object), the touch position data corresponding to that finger can be individually filtered with a number of IIR, FIR, median, or other filters for different applications (curvature, speed, or the like). Gesture detection algorithms may also benefit from a touch-sorting algorithm (i.e., individually tracking the touch data) because it will allow for a code reduction of complicated gestures and better tolerances on current gesture implementations.

In another embodiment, the processing logic receives raw touch position data representing positions of multiple touches on a sensing device. The raw touch position data may include a centroid position for each of the touches at discrete points in time, such as for each time the sensing device is scanned. The processing logic sorts the raw touch position data according to a touch identifier assigned to each of the centroid positions for each of the touches at the discrete points in time, and tracks the touches on the sensing device using the sorted touch position data. In another embodiment, the processing logic processes the sorted touch position data individually on a touch-by-touch basis for cursor movement and/or gesture detection. In one embodiment, the processing logic recognizes a gesture based on the tracking. In another embodiment, the processing logic individually filters the sorted touch position data corresponding to each of the touches. Since the touch position data is sorted, various filters can be applied to the data. For example, an adaptive low pass IIR filter can be used to smooth the touch position data, a median filter can be used to filter large variations in the touch position data, and an error detection filter, such as a large-finger-detection filter, can be used for error detection and non-touch removal. When the touch position data is unsorted, as done conventionally, these filters are not easily constructed, especially when the scan order of the detected touches changes. Alternatively, other filters can be applied to the sorted touch position data.

In another embodiment, the processing logic receives multiple samples of centroid positions at discrete time points corresponding to each of the touches. The processing logic assigns one of the touch indexes to each of the centroid positions of a first sample based on a scan order. The processing logic determines distances between the centroid positions of the first sample and centroid positions of a second sample, and assigns one of the touch indexes to each of the centroid positions of the second sample based on the closest centroid position from the first sample. The processing logic determines distances between the centroid positions of a third sample and predicted centroid positions based on velocities and time between scans of the touches computed from the centroid positions of the first and second samples. For example, in one embodiment, the processing logic calculates a velocity for each of the touches using the respective centroid positions of the first and second samples, and predicts a third centroid position for each of the touches using the respective velocity. The processing logic then assigns one of the touch indexes to each of the centroid positions of the third sample based on the closest predicted centroid positions.

In another embodiment, the processing logic determines distances between the centroid positions of a fourth sample and predicted centroid positions based on angular velocities of the touches computed from the centroid positions of the first, second, and third samples, and assigns one of the touch indexes to each of the centroid positions of the fourth sample based on the closest predicted centroid position. For example, in one embodiment, the processing logic calculates an angular velocity for each of the touches using the respective centroid positions of the first, second, and third samples, and predicts a fourth position for each of the touches using their respective angular velocity.

In another embodiment, the processing logic determines distances between the centroid positions of a fifth sample and predicted centroid positions based on angular velocities of the touches computed from the centroid positions of at least three of the first, second, third, and fourth samples, and assigns one of the touch indexes to each of the centroid positions of the fifth sample based on the closest predicted centroid position.

As described above, the touch-sorting algorithm may include three stages. In another embodiment, the processing logic receives additional raw touch position data, including centroid positions of an additional touch, such as during the second or third stages as described above. This may result from a new touch being detected on the sensing device. The processing logic processing the additional raw touch position data at the first stage, while processing the raw touch position data of the initial touches at the second or third stages without starting the touch-sorting algorithm over for all of the touches. In another embodiment, once a new touch has been detected, the processing logic starts processing the raw touch position data for all of the touches at the first stage.

Figure 4:
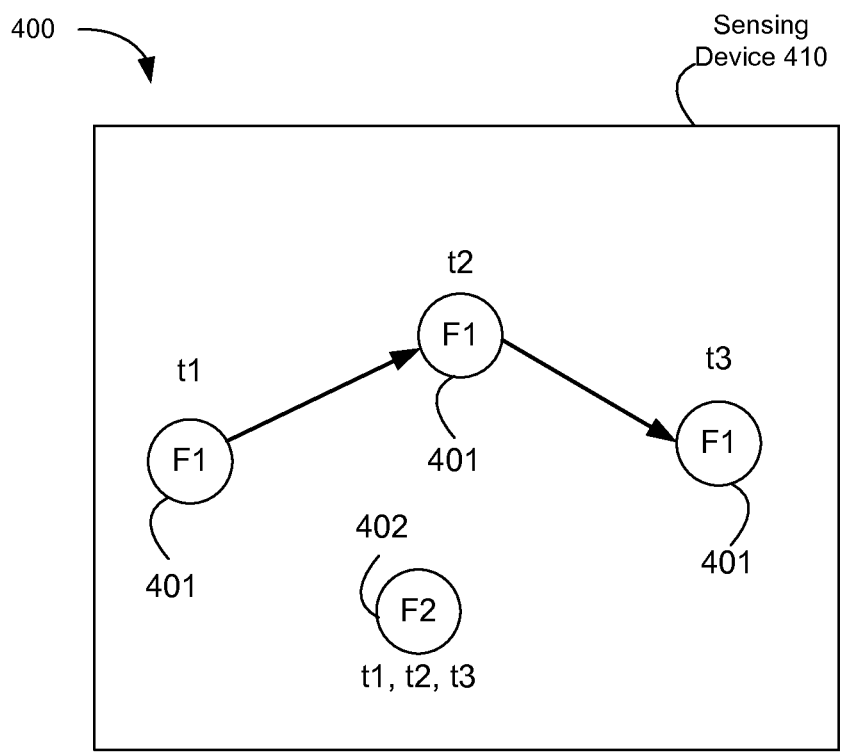
FIG. 4 illustrates a detection profile of two touches on a sensing device at three discrete points in time according to one embodiment.

FIG. 4 illustrates a detection profile 400 of two touches (F1 and F2) on a sensing device 410 at three discrete points in time (t1, t2, and t3) according to one embodiment. The detection profile 400 shows that the first touch 401 (F1) moves across the sensing device 410, while the second touch 402 (F2) remains approximately stationary, just like the movement of touches illustrated in FIG. 1. When scanning the sensors of the sensing device using a column index, the touch-sorting logic, at the first time point, t1, receives an X/Y centroid coordinate corresponding to the first touch 401 (F1), and then the X/Y centroid coordinate corresponding to the second touch 402 (F2). However, at the second and third time point, the processing device receives an X/Y centroid coordinate corresponding to the second touch 402 (F2), and then the X/Y centroid coordinate corresponding to the first touch 401 (F1), resulting in a change in the received order of the first and second touches 401 and 402. The touch-sorting logic, however, assigns a touch identifier to each of the centroid positions received. At time t1, the touch-sorting logic assigns the first X/Y centroid coordinate to the first touch 401 (F1), and then the second X/Y centroid coordinate to the second touch 402 (F2). Then at times t2 and t3, the touch-sorting logic assigns each of the second X/Y centroid coordinates received to the first touch 401 (F1), and assigns each of the first X/Y centroid coordinates received to the second touch 402 (F2), unlike done conventionally. The touch-sorting logic sorts the raw touch position data to individually track the touches despite the received order of the X/Y centroid coordinates. Also, unlike the conventional approach, when applying a filtering technique, the filtering technique does not fail when the order of received touches changes.

Figure 5:
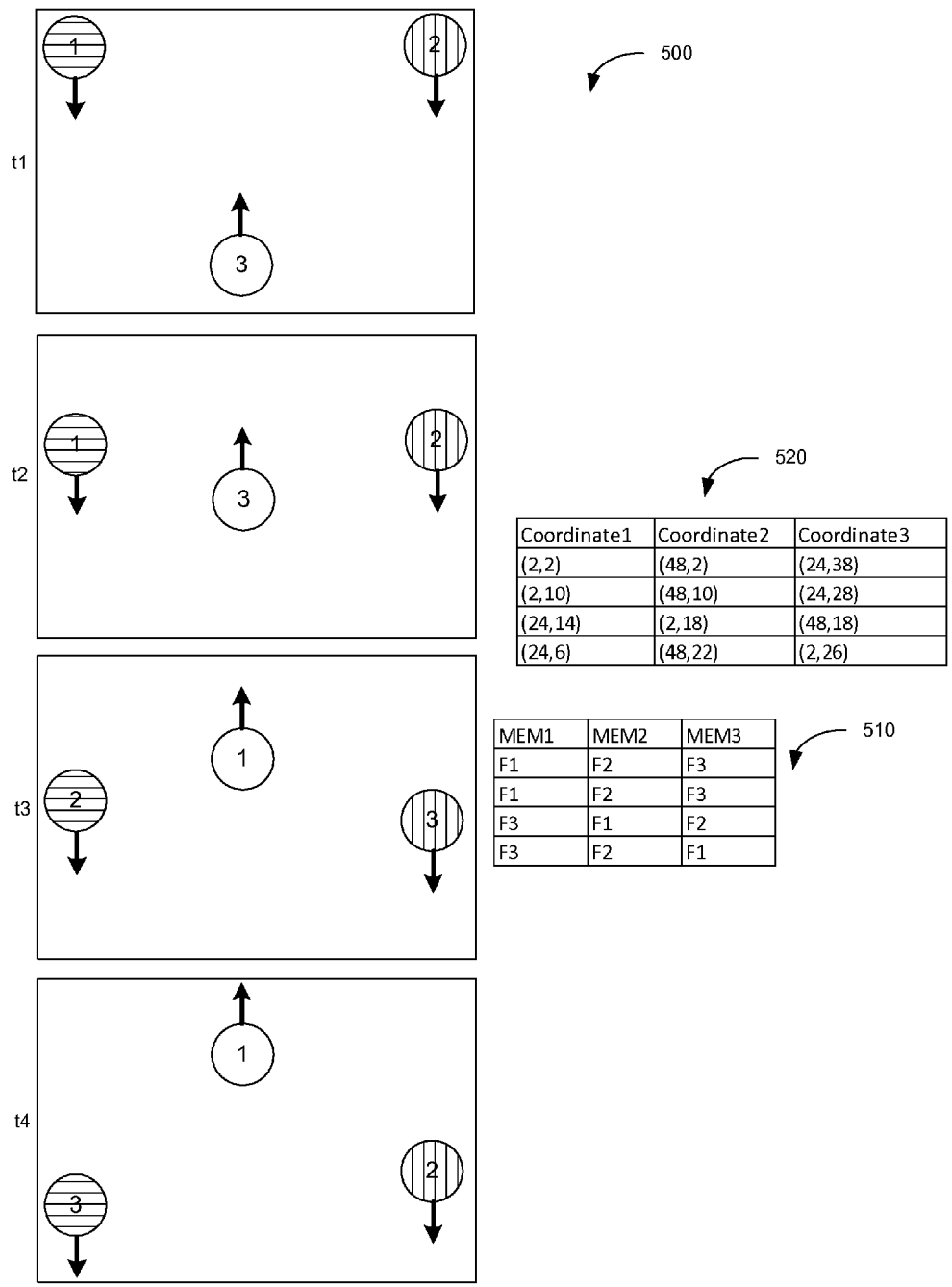
FIG. 5 illustrates detection profiles of three touches on a sensing device at four discrete points in time according to one embodiment.

FIG. 5 illustrates detection profiles 500 of three touches on a sensing device at four discrete points in time according to one embodiment. The four detection profiles show the time evolution of three touches as they move across an X/Y reporting surface of a sensing device, such as a trackpad or touchscreen. The upper left of the sending device is coordinate 0,0 and the lower right is coordinate 50,40. In this embodiment, the processing logic scans the sensing device from the upper right to the lower left across the horizontal rows to detect the touches. So, during movement of the touches there is a horizontal axis that when crossed, forces a change in the order of received touch positions. In this embodiment, the number stored in each circle is the naturally occurring order identifier of the reported touch, which basically shows the order in memory 510 for which the coordinate data is stored.

The two tables of FIG. 5 show the reported coordinates 520 from the sensing device and the touch indexes (e.g., a type of touch identifiers) stored in memory 510. In this case, the first touch is the circle with horizontal slashes, the second touch is the circle with the vertical slashes, and the third touch is the white circle. During the first scan at t1, the touch-sorting logic assigns the first detected touch the first touch index F1 (e.g., first finger), the second detected touch the second touch index F2 (e.g., second finger), and the third detected touch the third touch index F3 (e.g., third finger). During the second scan at t2, the touch-sorting logic assigns the same touch indexes, since the three touches are detected in the same order as the first scan. The touch-sorting logic stores the touch indexes F1, F2, and F3 in the first (MEM1), second (MEM2), and third (MEM3) memory locations, respectively. However, during the third scan at t3, the touch-sorting logic receives the coordinates for the third touch before the coordinates of the first and second touches. The touch-sorting logic determines that the first received coordinate belongs to the third touch, and thus, stores the third touch index F3 in the first memory location (MEM1) to indicate that the first received coordinates of the third scan correspond to the third touch. The touch-sorting logic determines that the second and third received coordinates belong to the first and second touches, respectively, and thus, stores the first touch index F1 in the second memory location (MEM2) and the second touch index F2 in the third memory location (MEM3), respectively. During the fourth scan at F4, the touch-sorting logic determines that the third touch's coordinates are received first, and that the received order of the first and second touches have changed, and thus, stores the third touch index F3 in the first memory location (MEM1), the second touch index F2 in the second memory location (MEM2), and the first touch index F1 in the third memory location (MEM3). By storing the touch indexes in the appropriate memory locations, the touch-sorting logic sorts the touch coordinates according to the touch index. The touch indexes, stored in memory, can be used to process the touch position data individually.

Although in this embodiment, a touch index (e.g., a type of touch identifier) is stored in the appropriate memory location to sort the raw touch position data, in another embodiment, the touch-sorting logic could rearrange the centroid coordinates and store them in the appropriate memory locations according to the touch identifier. In this embodiment, the memory location would effectively operate as the touch index or identifier. Alternatively, other mechanisms may be used to assign touch indexes to the corresponding touch position data as would be appreciated by one of ordinary skill in the art having the benefit of this disclosure.

Figure 6:
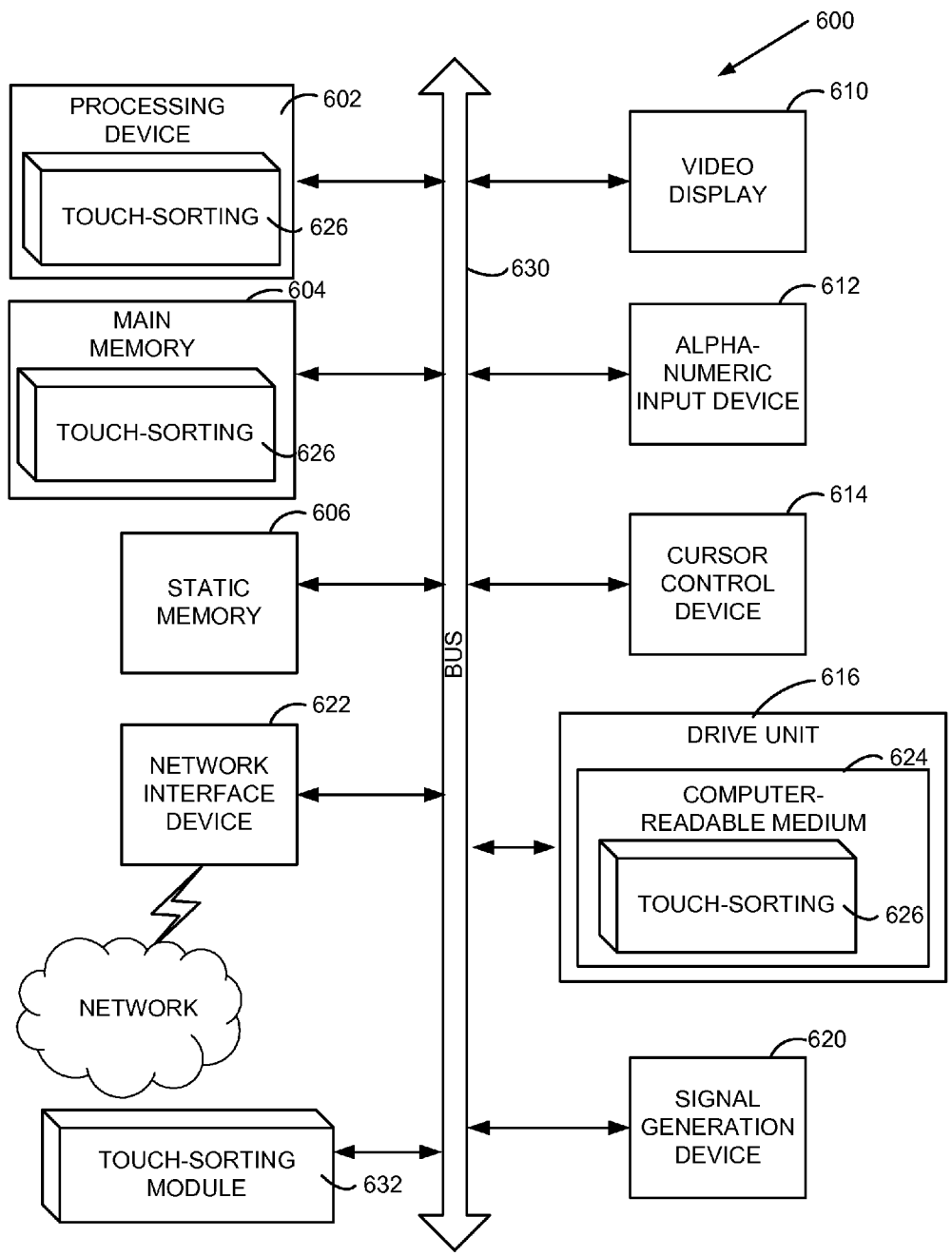
FIG. 6 illustrates a diagrammatic representation of a machine in the exemplary form of a computer system for sorting raw touch position data.

FIG. 6 illustrates a diagrammatic representation of a machine in the exemplary form of a computer system 600 for sorting raw touch position data. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for operations of sorting raw touch position data, such as the method 300 described above. In one embodiment, the computer system 600 represents various components that may be implemented in the electronic system 200 as described above. In one embodiment, the computer system 600 represents the components of the processing device 210. In another embodiment, the computer system 600 represents the components of the host 250. Alternatively, the electronic system may include more or less components as illustrated in the computer system 600.

The exemplary computer system 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 616, each of which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic (e.g., touch-sorting process 626) for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable storage medium 624 on which is stored one or more sets of instructions (e.g., touch-sorting process 626) embodying any one or more of the methodologies or functions described herein. The touch-sorting process 626 may also reside, completely or at least partially, within the main memory 604 and/or within the processing device 602 during execution thereof by the computer system 600, the main memory 604 and the processing device 602 also constituting computer-readable storage media. The touch-sorting process 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The touch-sorting module 632, components, and other features described herein (for example in relation to FIGS. 1 and 2) can be implemented as discrete hardware components or integrated in the functionality of hardware components such as ASICS, FPGAs, DSPs or similar devices. In addition, the touch-sorting module 632 can be implemented as firmware or functional circuitry within hardware devices. Further, the touch-sorting module 632 can be implemented in any combination hardware devices and software components.

Embodiments of the method and apparatus described herein may be implemented in a fully self-contained sensing device, which sorts the raw touch position data and outputs fully processed X/Y movement and gesture data signals or data commands to a host. In another embodiment, the method and apparatus may be implemented in a sensing device, which outputs X/Y movement data and also touch presence data to a host, and where the host processes the received data, (including sorts the raw touch position data), to detect touch movement and gestures. In another embodiment, the method and apparatus may be implemented in a sensing device, which outputs raw capacitance data to a host, where the host processes the capacitance data to compensate for quiescent and stray capacitance and environmental variations, and calculates X/Y movement. The host can also process the capacitance data to calculate centroids, sort the raw touch position data, and detect gestures using the calculated centroids. Alternatively, the method and apparatus may be implemented in a sensing device, which outputs pre-processed capacitance data to a host, where the sensing device processes the capacitance data to compensate for quiescent and stray capacitance and environmental variations, and the host calculates X/Y movement, sorts the raw touch position data and detects gestures from the pre-processed capacitance data. Alternatively, other configurations are possible.

The electronic system that includes the embodiments described herein may be implemented in a touch-sensor pad of a conventional laptop (e.g., notebook computer). Alternatively, it may be implemented in a wired or wireless keyboard integrating a touch-sensor pad, which is connected to a host. Alternatively, it may be implemented as a transparent touch screen. Alternatively, the embodiments may be implemented in a mobile handset (e.g., cellular or mobile phone) or other electronic devices where the touch-sensor pad or touch-sensor screen may operate in one of two or more modes. For example, the touch-sensor pad may operate either as a touch-sensor pad for X/Y positioning and gesture recognition, or as a keypad or other arrays of touch-sensor buttons and/or sliders. Alternatively, the touch-sensor pad, although configured to operate in the two or more modes, may be configured to be used only as a keypad, or only as a touch-sensor pad. Alternatively, the electronic device may be used in other applications, such as a PDA, a kiosk, a keyboard, a television, a remote control, a monitor, handheld electronics, such as a handheld multi-media device, a handheld video player, and a handheld gaming device, portable telephones, cellular telephones, notebook computers, a control panel, such as control panels of household or industrial appliances, or the like.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, implemented by a processing device programmed to perform the following, the method comprising:
receiving raw touch position data representing positions of a plurality of touches on a sensing device, wherein the raw touch position data comprises a centroid position for each of the plurality of touches at discrete points in time;
sorting the raw touch position data, into sorted touch position data, according to a touch index assigned to each of the centroid positions for each of the plurality of touches at the discrete points in time, wherein the sorting is performed in at least two stages, and wherein in each of the at least two stages the sorting comprises:
predicting the centroid positions for each touch of the plurality of touches;
comparing the predicted centroid positions for the each touch of the plurality of touches to the raw touch position data;
indexing the centroid position for the each touch of the plurality of touches based on the predicted centroid position, of the each touch, that is closest to the raw touch position data;
wherein the sorted touch position data is sorted according to the touch index assigned to each of the centroid positions for each of the plurality of touches; and
tracking the plurality of touches on the sensing device using the sorted touch position data.

2. The method of claim 1, wherein said tracking comprises processing the sorted touch position data corresponding to each of the plurality of touches individually on a touch-by-touch basis for at least one of cursor movement and gesture detection.

3. The method of claim 1, further comprising recognizing a gesture based on said tracking.

4. The method of claim 1, wherein said tracking comprises filtering the sorted touch position data, wherein the sorted touch position data corresponding to each of the plurality of touches is filtered individually.

5. The method of claim 4, wherein said filtering the sorted touch position data comprises filtering the sorted touch position data using an infinite impulse response (IIR) low pass filter.

6. The method of claim 4, wherein said filtering the sorted touch position data comprises filtering the sorted touch position data using a median filter.

7. The method of claim 4, wherein said filtering the sorted touch position data comprises filtering the sorted touch position data using an error detection filter.

8. The method of claim 1, wherein said receiving the raw data comprises receiving a plurality of samples of centroid positions at discrete points in time, each centroid position corresponding to a position of the plurality of touches at the respective discrete point in time, and wherein said sorting comprises:
  assigning one of the touch indexes to each of the centroid positions of a first sample based on a scan order;
  determining distances between the centroid positions of the first sample and centroid positions of a second sample;
  assigning one of the touch indexes to each of the centroid positions of the second sample based on the closest centroid position from the first sample;
  determining distances between the centroid positions of a third sample and predicted centroid positions based on velocities of the plurality of touches computed from the centroid positions of the first and second samples; and
  assigning one of the touch indexes to each of the centroid positions of the third sample based on the closest predicted centroid position.

9. The method of claim 8, wherein said sorting further comprises:
  calculating a velocity for each of the plurality of touches using the respective centroid positions of the first and second samples; and
  predicting a third centroid position for each of the plurality of touches using the respective velocity.

10. The method of claim 8, wherein said sorting further comprises:
  determining distances between the centroid positions of a fourth sample and predicted centroid positions based on angular velocities of the plurality of touches computed from the centroid positions of the first, second, and third samples; and
  assigning one of the touch indexes to each of the centroid positions of the fourth sample based on the closest predicted centroid position.

11. The method of claim 10, wherein said sorting further comprises:
  calculating an angular velocity for each of the plurality of touches using the respective centroid positions of the first, second, and third samples; and
  predicting a fourth position for each of the plurality of toches using the respective angular velocity.

12. The method of claim 10, wherein said sorting further comprises:
  determining distances between the centroid positions of a fifth sample and predicted centroid positions based on angular velocities of the plurality of touches computed from the centroid positions of at least three of the first, second, third, and fourth samples; and
  assigning one of the touch indexes to each of the centroid positions of the fifth sample based on the closest predicted centroid position.

13. The method of claim 1, wherein said sorting comprises three stages, and wherein said sorting comprises:
  during a first stage, calculating first distance measurements between the centroid positions at a first discrete point in time and the centroid positions at a second point in time to associate the touch index of the centroid positions at the first discrete point in time with the centroid positions at the second discrete point in time;
  during a second stage, calculating second distance measurements between the centroid positions at a third discrete point in time and predicted centroid positions based on a respective velocity of each of the plurality of touches; and
  during a third stage, calculating third distance measurements between the centroid positions at a fourth discrete point in time and predicted centroid positions based on a respective angular velocity of each of the plurality of touches.

14. The method of claim 13, further comprising:
  receiving additional raw touch position data, including centroid positions of an additional touch, during the second or third stage; and
  processing the additional raw touch position data at the first stage while processing the raw touch position data at the second or third stage.

15. A computer-readable storage medium having instructions, which when executed, cause a processing device to perform a method, the method comprising:
  receiving raw touch position data representing positions of a plurality of touches on a sensing device, wherein the raw touch position data comprises a centroid position for each of the plurality of touches at discrete points in time;
  sorting the raw touch position data, into sorted touch position data, according to a touch index assigned to each of the centroid positions for each of the plurality of touches at the discrete points in time, wherein the sorting is performed in at least two stages, and wherein in each of the at least two stages the sorting comprises:
    predicting the centroid positions for each touch of the plurality of touches;
    comparing the predicted centroid positions for the each touch of the plurality of touches to the raw touch position data;
    indexing the centroid position for the each touch of the plurality of touches based on the predicted centroid position, of the each touch, that is closest to the raw touch position data;
    wherein the sorted touch position data is sorted according to the touch index assigned to each of the centroid positions for each of the plurality of touches; and
  tracking the plurality of touches on the sensing device using the sorted touch position data.

16. The computer-readable storage medium of claim 15, further comprising processing the sorted touch position data corresponding to each of the plurality of touches individually on a touch-by-touch basis for at least one of cursor movement and gesture detection.

17. The computer-readable storage medium of claim 15, wherein said receiving the raw data comprises receiving a plurality of samples of centroid positions at discrete points in time, each centroid position corresponding to a position of the plurality of touches at the respective discrete point in time, and wherein said sorting comprises:
  assigning one of the touch indexes to each of the centroid positions of a first sample based on a scan order;
  determining distances between the centroid positions of the first sample and centroid positions of a second sample;
  assigning one of the touch indexes to each of the centroid positions of the second sample based on the closest centroid position from the first sample;
  determining distances between the centroid positions of a third sample and predicted centroid positions based on velocities of the plurality of touches computed from the centroid positions of the first and second samples; and assigning one of the touch indexes to each of the centroid positions of the third sample based on the closest predicted centroid position.

18. The computer-readable storage medium of claim 17, wherein said sorting further comprises:

determining distances between the centroid positions of a fourth sample and predicted centroid positions based on angular velocities of the plurality of touches computed from the centroid positions of the first, second, and third samples; and assigning one of the touch indexes to each of the centroid positions of the fourth sample based on the closest predicted centroid position.

19. An apparatus, comprising:

a memory; and a processing device, coupled to the memory, comprising touch sorting logic, wherein the touch sorting logic is configured to receive raw touch position data representing positions of a plurality of touches on a sensing device, wherein the raw touch position data comprises a centroid position for each of the plurality of touches at discrete points in time, wherein the touch sorting logic is further configured to sort the raw touch position data, into sorted touch position data, according to a touch index assigned to each of the centroid positions for each of the plurality of touches at the discrete points in time, wherein the touch sorting logic is further configured to sort the raw touch position data in at least two stages, wherein in each of the at least two stages the touch sorting logic predicts the centroid positions for each touch of the plurality of touches, compares the predicted centroid positions for the each touch of the plurality of touches to the raw touch position data, and indexes the centroid position for the each touch of the plurality of touches based on the predicted centroid position, of the each touch, that is closest to the raw touch position data, wherein the sorted touch position data is sorted according to the touch index assigned to each of the centroid positions for each of the plurality of touches, and wherein the touch sorting logic is further configured to track the plurality of touches on the sensing device using the sorted touch position data.

20. The apparatus of claim 19, wherein the processing device further comprises a filter coupled to the touch sorting logic, wherein the filter is configured to individually filter the sorted touch position data corresponding to each of the plurality of touches.

* * * * *